US010033462B2

(12) United States Patent
    Amundson

(10) Patent No.: US 10,033,462 B2
(45) Date of Patent: *Jul. 24, 2018

(54) FIBER TO THE HOME NETWORK INCORPORATING FULLY CONNECTORIZED OPTIC FIBER TAP ASSEMBLY

(71) Applicant: Telephone and Data Systems, Inc., Chicago, IL (US)

(72) Inventor: John Carl Amundson, Verona, WI (US)

(73) Assignee: Telephone and Data Systems, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,893

(22) Filed: Sep. 8, 2017

(65) Prior Publication Data
US 2018/0048392 A1    Feb. 15, 2018

Related U.S. Application Data

(63) Continuation of application No. 15/235,366, filed on Aug. 12, 2016, now Pat. No. 9,762,322.

(51) Int. Cl.
    *H04B 10/00*    (2013.01)
    *H04B 10/25*    (2013.01)
    *G02B 6/38*     (2006.01)
    *H04B 10/27*    (2013.01)
    *H04J 14/00*    (2006.01)

(52) U.S. Cl.
    CPC ....... *H04B 10/2504* (2013.01); *G02B 6/3897* (2013.01); *H04B 10/27* (2013.01)

(58) Field of Classification Search
    CPC ............. H04B 10/272; H04B 10/2725; H04B 10/275; H04B 10/2755; H04B 10/278; H04J 14/08; H04J 14/083
    See application file for complete search history.

(56) References Cited

U.S. PATENT DOCUMENTS 9,762,322  B1 *  9/2017  Amundson ........ H04B 10/2504
2003/0202752  A1 *  10/2003  Gall ........................ G02B 6/32
                                                                    385/61
(Continued)

*Primary Examiner* — Daniel Dobson
(74) *Attorney, Agent, or Firm* — Leydig, Voit & Mayer, Ltd.

(57) ABSTRACT

A fully connectorized optic fiber tap assembly is described that includes a first upstream connector interface configured to receive a downstream connector of a first upstream optic fiber line, and a first downstream connector interface configured to receive an upstream connector of a first downstream optic fiber line. The tap assembly further includes a set of service drop line connector interfaces. Moreover, an optic fiber tap of the assembly is configured to: receive an optical signal from the upstream connector interface, extract a portion of the optical signal, direct the extracted portion of the optical signal to the set of service drop line connector interfaces, and pass a remaining portion of the optical signal to the downstream connector interface. The fully connectorized optic fiber tap assembly is configured to be connected to the first upstream optic fiber line and the first downstream optic fiber line without splicing.

14 Claims, 10 Drawing Sheets

(56) References Cited

U.S. PATENT DOCUMENTS

2006/0245687 A1\* 11/2006 Gall .................... H04B 10/272 385/24
2015/0222429 A1\* 8/2015 Vilella ................ H04B 10/272 380/256

\* cited by examiner

FIBER TO THE HOME NETWORK INCORPORATING FULLY CONNECTORIZED OPTIC FIBER TAP ASSEMBLY

CROSS-REFERENCE TO RELATED APPLICATIONS

This application is a continuation of U.S. application Ser. No. 15/235,366, filed Aug. 12, 2016 (U.S. Pat. No. 9,762, 322), which is expressly incorporated by reference in its entirety, including any references contained therein.

BACKGROUND OF THE INVENTION

Field of the Invention

Over the years user demand for higher data transmission rates have led to the adoption of optic fiber technology for residential customers of Internet service providers (ISPs)/ data network communications carriers. The day has passed where download rates of less than a megabit are considered satisfactory for most residential customers. Instead, the need to carry one or more streams of high definition video has led to wide demand for multiple download data rates of 10 megabits or more.

Such demand cannot be met without substantial cost. The discussion herein focuses upon the costs associated with the physical optic fiber distribution infrastructure comprising a set of serially connected optic fiber tap assemblies carrying high speed data from ISPs to residential customers. Optic fiber distribution networks, while capable of carrying substantially higher volumes of data in comparison to copper wire technologies, are also substantially more expensive to build and repair.

One of the most vital aspects of providing high speed data communications connectivity is maintaining nearly continuous service. In the case of a rare service disruption, normal operation must be quickly restored. However, the cost for added assurance against consumer dissatisfaction arising from lengthy data network communications service outages is extremely high.

One of the most important events to avoid is cutting an optic fiber distribution line providing high speed data network connectivity to a substantial number of customers. To avoid instances of cutting optic fiber, during an initial build-out of an optic fiber sub-network, a series of bores, channels, and/or trenches are formed. Thereafter, optic fiber is fed/laid, either with or without protective conduit, at a sufficient depth to ensure against damage to the optic fiber during subsequent activities of others—e.g., trenching operations associated with laying utility lines. For this reason, optic fiber distribution lines are buried several feet below grade. Moreover, where a risk of cutting the fiber is high, the optic fiber is placed within the buried conduit. The relatively deep placement of fiber distribution lines, from which one or more residential drop fibers branch at a final stage of an optic fiber, provides a higher level of confidence that the distribution fiber will not be damaged by digging, excavating or other activities within the vicinity of the distribution lines.

On the other hand, relatively inexpensive short-depth plowing, to a depth of about a foot, and then laying optic fiber in the resulting valley, enables relatively low-cost initial laying of an optic fiber distribution line in comparison to horizontal bore drilling and deep trenching approaches for laying optic fiber distribution lines. However, such initial cost savings are offset by a substantially heightened risk of costly subsequent damage to the optic fiber over the lifetime of the distribution sub-network.

In that regard, repairing a cut optic fiber line typically involves a complex fiber splicing operation. During the splicing operation, the two ends of adjoined optic fibers are heat-fused in a portable clean room environment. The cost of splicing a single broken optic fiber is thousands of dollars. Moreover, the repair process requires use of specialized tools in the hands of an expert. In that case, it may take days for such repair. In the mean time, a data network service provider must deal with irate customers without high speed data communication services for several hours—if not days—while waiting for completion of repairs to a cut optic fiber.

Ensuring the long-term satisfaction of residential customers is a multifaceted endeavor. First, the high speed data service connectivity must be reliable. Second, in the case of connectivity interruptions, service must be quickly restored. Third, the high speed data communications network connectivity must be provided at a reasonable cost. The last of which, in many cases, is only possible if the initial build-out costs are not excessive.

Another aspect of optic fiber distribution sub-network designs is the forming of leaves corresponding to individual residential network interface units. One type of signal distribution element is a splitter that provides a 1 to N distribution at a splitter point (either at a hub or a downstream local distribution point). Alternatively, a series of optic fiber tap assemblies, joined by optic fiber, take a specified portion of input signal power, which is less than half (e.g. 10 to 50 percent) of an input optical power. The remaining optical power is passed along to the next tap assembly on the series of optic fiber tap assemblies of a single optic fiber distribution line.

SUMMARY OF THE INVENTION

Embodiments of the invention are used to provide a connectorized optic fiber tap assembly structure and a optic fiber distribution sub-network incorporating the connectorized optic fiber tap assembly structures that include optic fiber connector interfaces for joining fully connectorized optic fiber tap assemblies and connectorized optic fiber drop lines in the optic fiber distribution sub-network.

In particular, a fully connectorized optic fiber tap assembly is described that includes a first upstream connector interface configured to receive a downstream connector of a first upstream optic fiber line, and a first downstream connector interface configured to receive an upstream connector of a first downstream optic fiber line. The tap assembly further includes a set of service drop line connector interfaces. Moreover, an optic fiber tap of the assembly is configured to: receive an optical signal from the upstream connector interface, extract a portion of the optical signal, direct the extracted portion of the optical signal to the set of service drop line connector interfaces, and pass a remaining portion of the optical signal to the downstream connector interface. The fully connectorized optic fiber tap assembly is configured to be connected to the first upstream optic fiber line and the first downstream optic fiber line without splicing.

A fiber optic distribution sub-network is also described that includes one or more of the above-described fully connectorized optic fiber tap assemblies to facilitate expedited installation and repair of optic fiber distribution lines.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
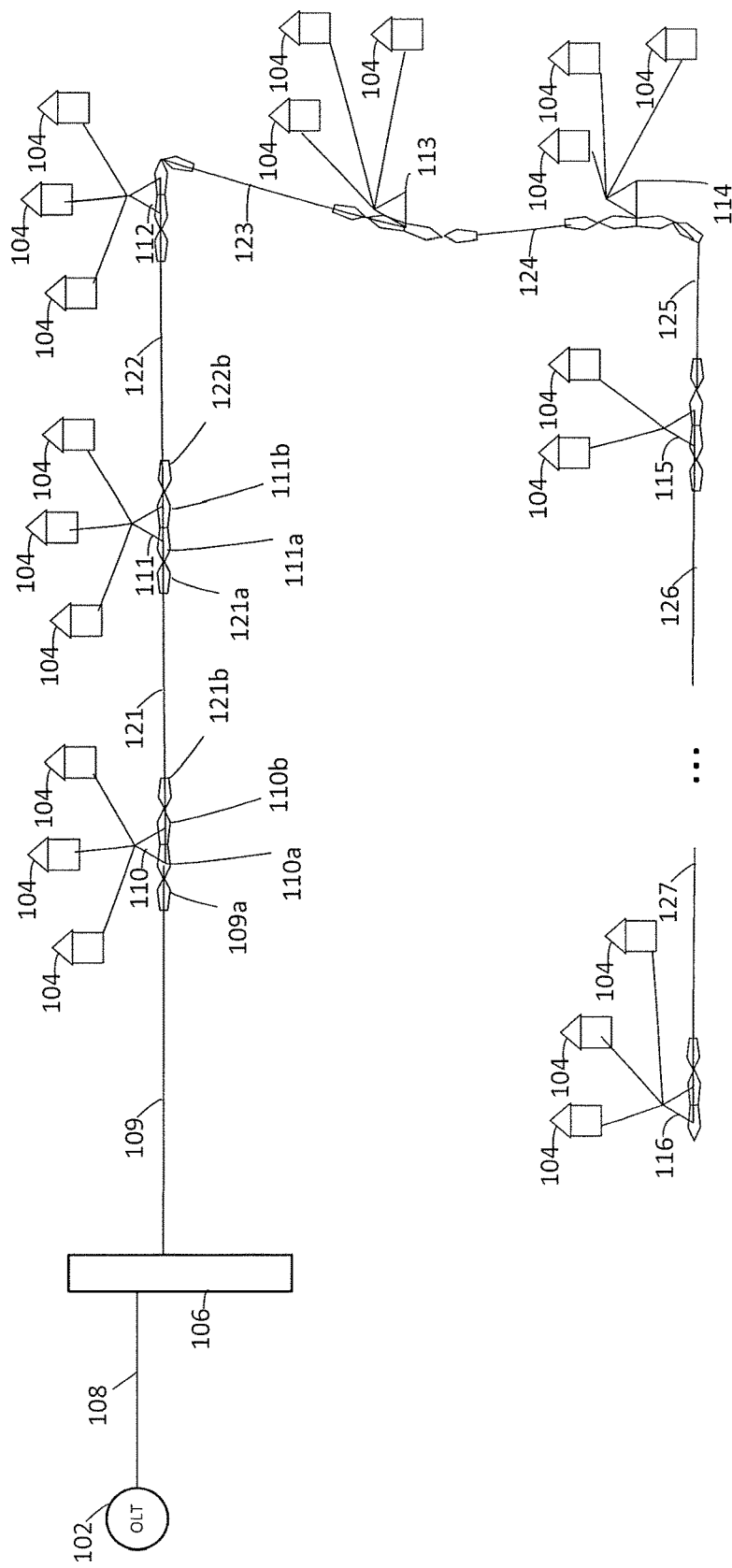
FIG. 1 is a schematic diagram illustrating an exemplary residential optic fiber distribution sub-network incorporating connectorized optic fiber tap assembly structures.

Before describing the provided figures, in general the described physical optic fiber distribution infrastructure comprises a set of serially connected optic fiber tap assemblies carrying high speed data from ISPs to residential customers that incorporate particular noteworthy features. First, the series-connected optic fiber tap assemblies comprise fully connectorized optic fiber tap assemblies. Each fully connectorized optic fiber tap assembly comprises both: (1) upstream and downstream optic fiber connector interfaces to which corresponding connectorized optic fiber connectors are connected to form a distribution line comprising multiple serially connected optic fiber taps in an optic fiber sub-network, and (2) service drop optic fiber connector interfaces that provide the tapped optical signal to, for example, a residence. The upstream/downstream connector interfaces of the fully connectorized optic fiber tap assembly eliminate time consuming field splicing operations during build-out and repair on optic fiber distribution sub-networks. The service drop line connector interface of the fully connectorized optic fiber tap assembly remains unchanged. The connectorized interface on an optic fiber tap assembly structure, providing a plug (as opposed to splice) interface to upstream and downstream optic fiber distribution lines, contrasts with known optic fiber tap assemblies having distribution line interfaces that require spliced (fused) connections between upstream/downstream optic fiber distribution lines and the optic fiber tap assembly structure. Connectorization of the optic fiber tap assembly distribution line interfaces facilitates relatively low cost repair of a damaged optic fiber distribution line connecting two serially connected optic fiber tap assemblies when compared to optic fiber tap assemblies having a splice-based interface to distribution lines.

Second, the relatively easy replacement of damaged optic fiber distribution lines arising from the above-described connectorization—as opposed to splicing—of optic fiber tap assemblies, in turn, reduces costs associated with damage to individual optic fiber distribution lines. Such costs include: (1) new optic fiber line, (2) repair service fees, and (3) lost good-will arising customer service disruption. However, the combination of shallow depth and connectors (as opposed to line splices) significantly reduce each of the three costs associated with damage to an optic fiber distribution line causing a disruption of data communications services for customers downstream from the damage.

The significant reduction in repair costs leads to viability of laying optic fiber distribution lines at a depth of about a foot using the substantially less expensive plowing method—as opposed to relatively deep trenching at multiple (e.g. three or more) feet. Moreover, the primary data communication lines, which connect sub-networks (e.g. block area sub-networks), are protected. However, the optic fiber distribution lines within a block (sub-network) are not protected (e.g., no conduit is used within the sub-network). The heightened risk/cost of potentially having to replace a damaged optic fiber distribution line is far outweighed by the substantial cost savings associated with the initial build-out and subsequent repair (if needed) of the optic fiber distribution line comprising a series of optic fiber tap assemblies connected by optic fiber distribution lines buried at a relatively shallow depth in comparison to a typical trench depth of multiple feet.

Additional changes to the optic fiber distribution network topology include simplified interfaces between a local optic fiber distribution sub-network, having the serially arranged set of connectorized optic fiber tap assemblies, and primary data communication lines (coaxial cable or optic fiber) supplying the local sub-networks. Rather than running multiple optic fiber lines within the local sub-networks corresponding to a particular residential block, a single optic fiber distribution line, including multiple serially connected optic fiber tap assemblies (each supporting multiple residential drop fiber lines), provides optic fiber communications connectivity for residences on the block. The local sub-network distribution line is laid in the vicinity of adjoining back yard rear lot lines of opposing lots on a same residential block.

Turning to FIG. 1, an exemplary residential optic fiber distribution sub-network incorporates the above-discussed serially arranged connectorized optic fiber tap assembly structures. An optical line terminal (OLT) 102 provides an interface to a primary (high capacity) communication network link serving multiple optic fiber distribution sub-networks such as the one depicted in FIG. 1. By way of example, the OLT 102 performs an electrical/optical signal conversion to render a suitable signal on the local sub-network for transmission to one of the multiple connected network interface units (NIUs) 104. The OLT 102 further performs optical/electrical signal conversion on data transmissions originating from network interface units of individual residences. In accordance with a known GPON protocol, an output port at GPON hardware, providing a primary physical data communications link to which the optic fiber sub-networks connect, corresponds to the OLT 102.

The OLT 102 output designated/designed to provide a particular output power that affects a quantity of fully connectorized optic fiber tap assemblies that may be serially connected by connectorized optic fiber distribution lines in accordance with illustrative examples of optic fiber sub-networks incorporating connectorized optic fiber tap assemblies. Currently, two optical power levels ("B" and "C") are supported. The B level optical power level has a loss budget of 28 db and the C level optical power level has a loss budget of 32 db. Thus, the C level output configuration generally supports greater optical signal power loss—whether through optical power tapping (redirecting the light energy to residential network interface units 104) or connector losses experienced at the connector interfaces of the fully connectorized optic fiber tap assemblies and the connectorized optic fiber distribution lines connecting the fully connectorized optic fiber tap assemblies.

The following are exemplary cases of maximum fully connectorized optic fiber tap assembly chains supported by the OLT 102 where series-connected optical taps provide optical signals to specified quantities of optic fiber drop line-connected NIUs 104:

B optics
  up to 7 series-connected 8 drop line optic fiber tap assemblies.
  up to 12 series-connected 4 drop line optic fiber tap assemblies.
  up to 16 series-connected 2 drop line optic fiber tap assemblies.
C optics
  up to 10 series-connected 8 drop line optic fiber tap assemblies.
  up to 16 series-connected 4 drop line optic fiber tap assemblies.
  up to 20 series-connected 2 drop line optic fiber tap assemblies.

In the exemplary embodiment, a single optic fiber 108 connects the OLT 102 to a fiber patch panel 106 of known design. The fiber patch panel 106 in certain installations provides an above ground enclosure housing one or more connection points between an originating optical signal interface of the OLT 102, carried by the single optic fiber 108, and a single optic fiber 109 corresponding to the first link of a optic fiber distribution sub-network comprising a series of linked connectorized optic fiber tap assemblies. In the illustrative example, the single optic fiber 109 comprises a connector 109a that mates with a complementary connector interface provided by an upstream connector 110a of a connectorized optic fiber tap 110.

The fiber patch panel 106, in practice, may comprise multiple lines, such as the single optic fiber line 108, connected to an OLT such as the OLT 102. The fiber patch panel 106, in practice, may further comprise multiple single optic fiber lines coupled to a corresponding sub-network, such as the single optic fiber 109, connected the sub-network of FIG. 1 comprising the connectorized optic fiber tap 110.

The illustrative example in FIG. 1 depicts an optic fiber distribution sub-network including a set of serially connected fully connectorized optic fiber tap assemblies 110, 111, 112, 113, 114, 115, 116. The connectorized optic fiber tap assemblies 110-116 are passive devices—i.e. they have no source of power other than the optical energy carried by the input signal. As such, the output signal power of each tap is decreased as a result of: (1) optical signal power tapped for transmission to optically coupled ones of the NIUs 104, and (2) optical signal losses arising from connection interfaces. Thus, the number of total serially chained optic fiber tap connections is limited by optical signal losses at each one of the optic fiber tap assemblies 110-115.

The connector interfaces of the fully connectorized optic fiber tap assemblies 110-116 include factory-installed, low signal power loss, connector interfaces that facilitate joining connectorized optic fiber distribution lines that couple neighboring ones of the serially connected optic fiber tap assemblies 110-116. In that regard, each fully connectorized optic fiber tap (e.g., optic fiber tap 110) includes an upstream optic fiber connector (e.g. upstream optic fiber connector 110a for optic fiber tap 110) and a downstream optic fiber connector (e.g. downstream optic fiber connector 110b for optic fiber tap 110). Thus, connectorized optic fiber tap 111 includes upstream optic fiber connector 111a and downstream optic fiber connector 111b. Each of the remaining connectorized optic fiber tap assemblies 112, 113, 114, 115 and 116 also include the aforementioned upstream and downstream optic fiber connectors.

Moreover, connector interfaces of the fully connectorized optic fiber tap assemblies 110-116 have a wavelength window of 1260 nm to 1620 nm. As a consequence, the connectorized optic fiber tap assemblies may be to be used with any one of a variety of FTTH protocols including, but not limited to: BPON, GPON, EPON, NGPON2, and RFOG.

The fully connectorized optic fiber tap assemblies 110-116 can be used by any over-the-land data communications services providers that provide data connectivity via FTTH sub-networks. The fully connectorized optic fiber tap assemblies 110-116 are passive devices, and thus no external power or batteries are generally needed. The connectorized optic fiber tap assemblies 110-116 can be mounted in a buried plant pedestal/enclosure or mounted to a pole or stand in an aerial plant application. The fully connectorized optic fiber tap assemblies 110-116 are temperature hardened to withstand placement outdoors with no environmental conditioning.

In accordance with an aspect of exemplary configurations of the optic fiber tap assemblies 110-116, a variable percentage of total input power is "tapped" by individual ones of the serially connected optic fiber tap assemblies 110-116. By way of example, since the available input optical power decreases at each optic fiber tap output, as a general rule the percentage of total input optical power tapped is lowest at the first fully connectorized optic fiber tap assembly (e.g. optic fiber tap assembly 110) and the tapped percentage of input power increases at subsequently encountered ones of the remaining fully connectorized optic fiber tap assemblies 112, 113, 114, 115. The last fully connectorized optic fiber tap assembly 116 in the chain of optic fiber tap assemblies may be configured to tap and split all the remaining optical signal power. The tapped percentage may also vary in accordance with the number of connected optic fiber drop lines from any given one of the fully connectorized optic fiber tap assemblies 110-116. Moreover, in a particular embodiment that is based upon an active optic fiber tap assembly component (see FIG. 10 described herein below), the percentage of tapped optical power at each one of the fully connectorized optic fiber tap assemblies is dynamically configured based upon signal level feedback provided by at least one NIU 104 connected to each one of the chain of fully connectorized optic fiber tap assemblies 110-116. Additionally, the active optic fiber tap performs responsive/on-demand amplification of the input signal to ensure sufficient optical signal strength in the output signal for all downstream optical fiber taps and/or receivers (e.g. NIU 104) on the sub-network.

A set of connectorized optic fiber distribution lines 121, 122, 123, 124, 125, 126 and 127 couple pairs of the serially-connected fully connectorized optic fiber tap assemblies 110-116. Each of the connectorized optic fiber distribution lines 121-127 includes a corresponding upstream connector interface 121b, 122b, 123b, 124b, 125b, 126b and 127b. Each of the connectorized optic fiber distribution lines 121-127 includes a corresponding downstream connector interface 121a, 122a, 123a, 124a, 125a, 126a and 127a. As noted above, the connectorized optic fiber distribution lines 121-127 are buried at a relatively shallow depth of about a foot. This burial depth differs from typical installation depths of over two feet to ensure against cutting/damage after build-out of the optic fiber distribution sub-network.

The connectorized interfaces of the optic fiber distribution lines 121-127 exhibit a relatively lower signal loss than connectorized interfaces of optic fiber drop lines between NIU's and the connectorized optic fiber tap assemblies 110-116. For example the connector interfaces of the optic fiber distribution lines 121-127 are SC/APC connectors (SC angled polished connector). The loss characteristics of the SC/APC connectors are generally better than the loss characteristics of the interface connectors of the optic fiber tap assemblies to which residential optic fiber drops are connected for the NIUs 104. In general, given the introduction of significant signal losses at the optic fiber distribution line connections between serially connected fully connectorized optic fiber tap assemblies (e.g. optic fiber tap assemblies 110 and 111), the connectorized optic fiber distribution lines 121-127 use a low loss connector, such as SC/APC, on both optic fiber ends.

The system schematically depicted in FIG. 1 generally depicts an exemplary sub-network comprising a series of connectorized optic fiber tap assemblies serially coupled together using connectorized optic fiber distribution lines. Thus, the above description is meant to be exemplary in nature—as opposed to being exhaustive—since the described elements, with the exception of connectorized optic fiber tap assemblies, are generally known in the optic fiber distribution network infrastructure field.

Figure 2:
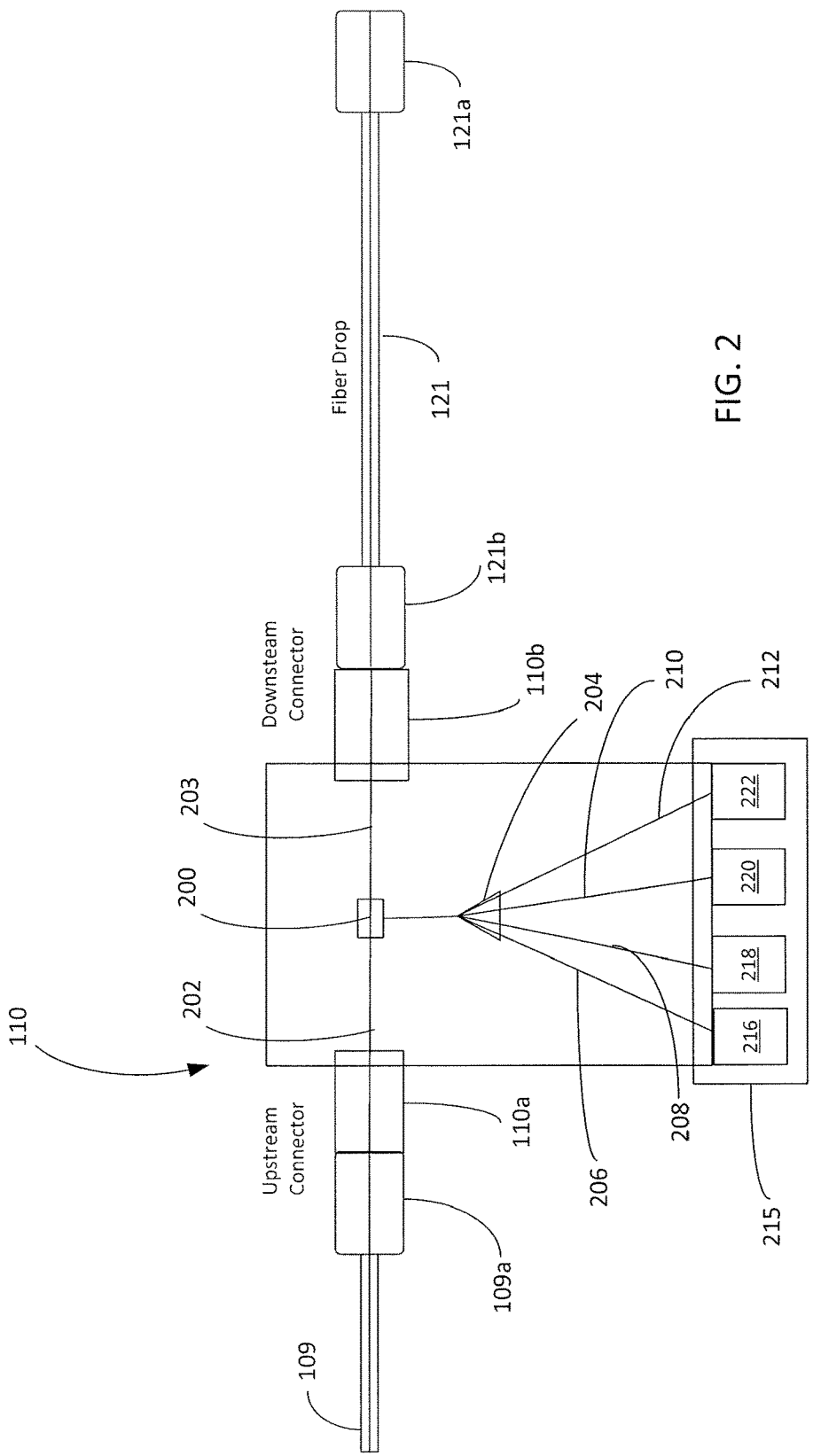
FIG. 2 is a schematic drawing of an exemplary optic fiber tap assembly structure incorporated into the sub-network depicted in FIG. 1.

Having described structural/functional elements of an exemplary optic fiber distribution sub-network, attention is directed to the fully connectorized optic fiber tap assembly structures. Turning to FIG. 2, a schematic drawing is provided of the fully connectorized optic fiber tap assembly 110. As previously explained, the fully connectorized optic fiber tap assembly 110 provides optic fiber drop line connectivity between a customer's NIU (e.g. NIU 104) and the optic fiber distribution line 109 of the optic fiber distribution sub-network (see FIG. 1). The fully connectorized optic fiber tap assembly 110 includes an optic fiber tap 200 configured to redirect a portion (e.g. 10-50 percent) of the optical energy carried on an internal optic fiber line 202 of the upstream connector 110a. Thereafter, an optical splitter structure 204 evenly distributes the redirected optical energy via lines 206, 208, 210 and 212 to a set of residential drop line connectors 215, including individual physical optic fiber line connector interfaces 216, 218, 220 and 222. As the first optic fiber tap in the series of optical taps, the optic fiber tap 200 receives a relatively high power optical signal (in comparison to subsequent optical taps within the remaining fully connectorized optical tap assemblies 211-216 in the exemplary sub-network depicted in FIG. 1). Thus, minimal tapping (e.g., 10 percent) of the optical power input on internal optic fiber line 202 occurs. The remaining portion (e.g. 90 percent) passes via internal optic fiber line 203 of the downstream connector 110b. The remaining portion, subject to minimized attenuation at a connection interface between the fully connectorized optic fiber tap assembly downstream connector 110b and the upstream connector interface 121b of the optic fiber distribution line 121.

Figure 3:
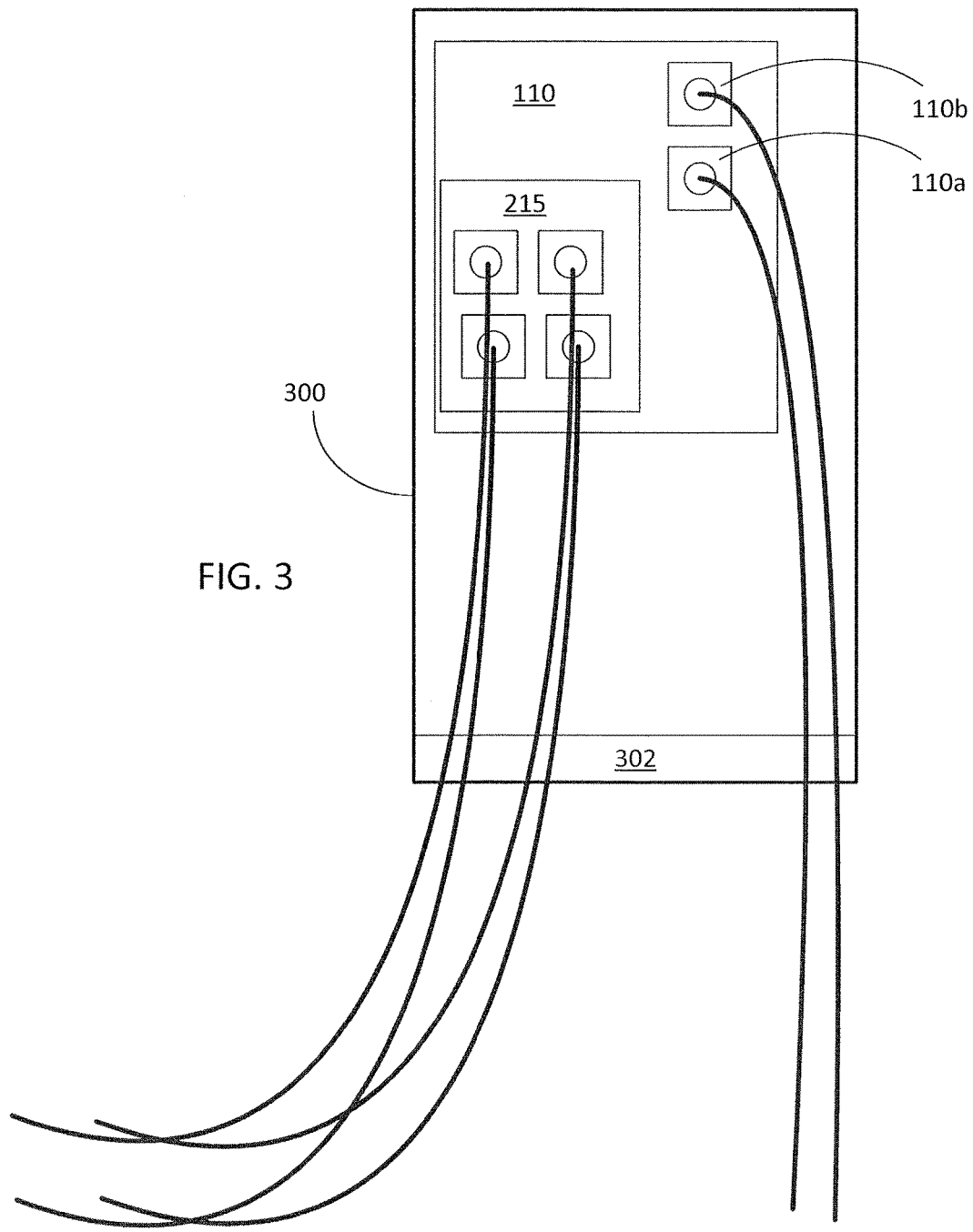
FIG. 3 is a drawing depicting an exemplary external interface of a fully connectorized optic fiber tap assembly of the type depicted in FIG. 2 and utilized in the optic fiber distribution sub-network depicted in FIG. 1.

Turning to FIG. 3, an exemplary physical layout for a cabinet 300 housing the fully connectorized optic fiber tap assembly 110 is provided. The cabinet 300 includes a cable management and weather seal 302. A front panel of the cabinet 300 is removed to show the external optic fiber connector interfaces of the fully connectorized optic fiber tap assembly 110. The set of residential drop line connectors 215 are shown with corresponding connectorized customer service optic fiber drop lines. Optic fiber tap assembly upstream connector 110a and optic fiber tap assembly downstream connector 110b are depicted with connectorized optic fiber distribution lines 109 and 121, respectively.

It is noted that the upstream and downstream optic fiber distribution lines 109 and 121 may be single fiber lines (as depicted in FIG. 3). However, the fully connectorized optic fiber tap assembly structures may accommodate multiple optic fiber distribution lines in a by-pass arrangement. Therefore, turning to FIG. 4, in addition to a tapped optic fiber line that is connected to the assembly 400 via the input/output connectors 400a/400b, a further fully connectorized optic fiber tap assembly 400 includes a pass-through connection supported by pass-through circuitry having an external connector interface. In particular, an upstream optic fiber connector interface 402 is coupled to a complementary downstream optic fiber connector. Thereafter, the optical signal received via connector interface 402 is passed through the assembly 400, without tapping, via optic fiber line 403. The optical signal passes via downstream optic fiber connector interface 404 that is coupled to a complementary upstream optic fiber connector. The connector interfaces 402 and 404 are low loss to preserve optical power as the received optical signal is passed through the assembly 400. While signal loss will occur in the interfaces 402 and 404, the signal loss can be minimized. The advantage of such arrangement is the ability to facilitate quick/low cost repair when the pass-through optic fiber line is cut.

Figure 4:
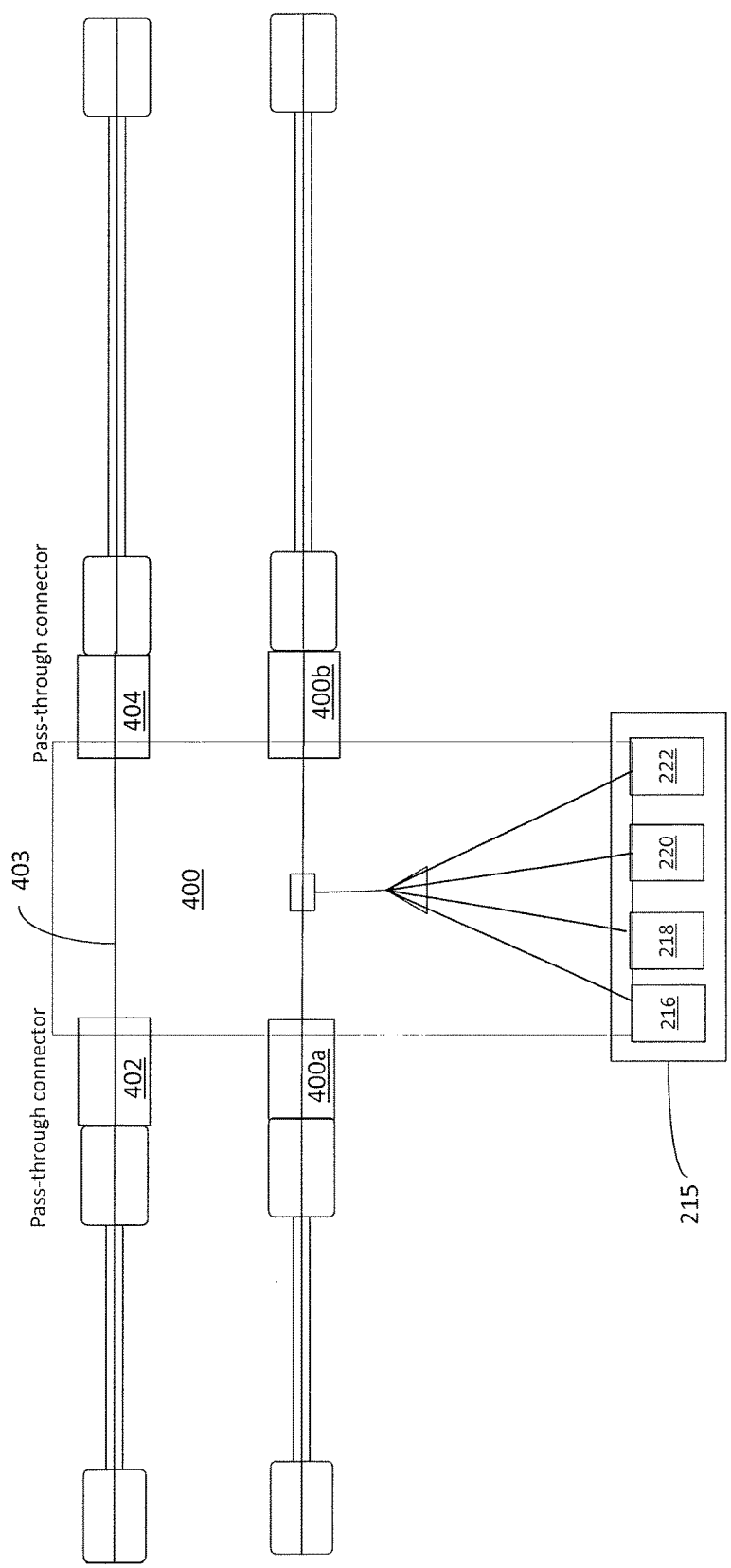
FIG. 4 is a schematic drawing of an exemplary optic fiber tap assembly structure incorporated into a n
Figure 5:
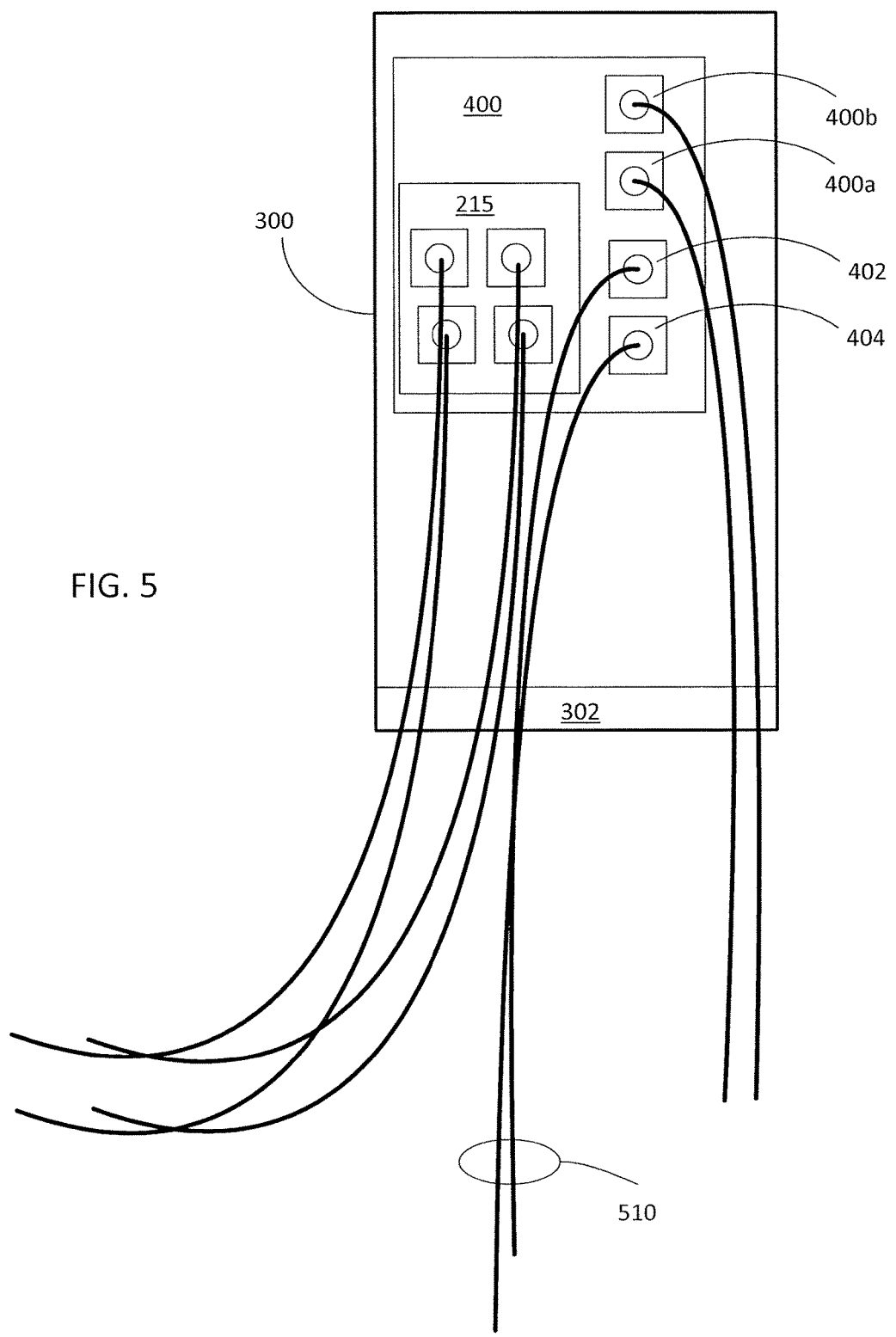
FIG. 5 is drawing depicting an exemplary external interface of a fully connectorized optic fiber tap assembly of the type depicted in FIG. 4.

Turning to FIG. 5, the cabinet 300 is depicted wherein the fully connectorized optic fiber tap assembly 400 incorporates a variation of the optic fiber connection interface depicted in FIG. 3 wherein the interface depicted in FIG. 3 is augmented to incorporate the upstream/downstream pass-through connection interfaces 402 and 404 (see FIG. 4) for the pass-through fiber line connections to connectorized optic fiber distribution lines in accordance with the pass-through arrangement schematically depicted in FIG. 4.

Figure 6:
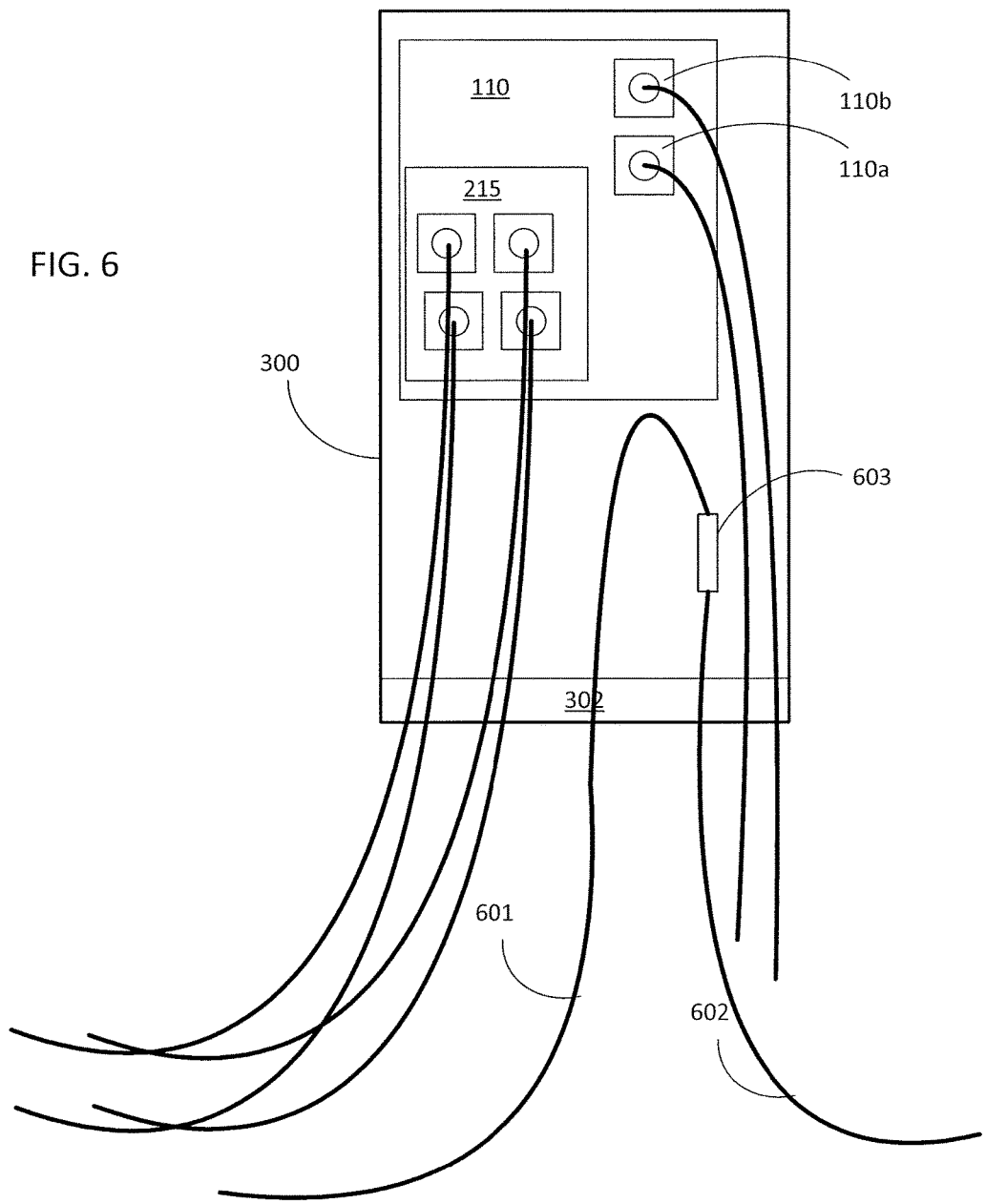
FIG. 6 is drawing depicting an exemplary external interface of a fully connectorized optic fiber tap assembly of the type depicted in FIG. 4 where a pass-through fiber is separately connectorized in relation to the optic fiber tap assembly.

Turning to FIG. 6, an exemplary cabinet 300 depicts an alternative to the optic fiber arrangements depicted in FIGS. 3 and 5. Notably, instead of incorporating pass-through optic fiber connector interface into the fully connectorized optic fiber tap assembly (see assembly 400 of FIG. 5), two optic fiber segments 601 and 602 are connectorized and joined together to form an intermediate connection 603 housed within the cabinet 300. While only a single pass-through connection is illustratively depicted, for purposes of simplifying the drawing, in practice multiple pass-through cables are potentially connected via connection interfaces housed within the cabinet 300.

Figure 7:
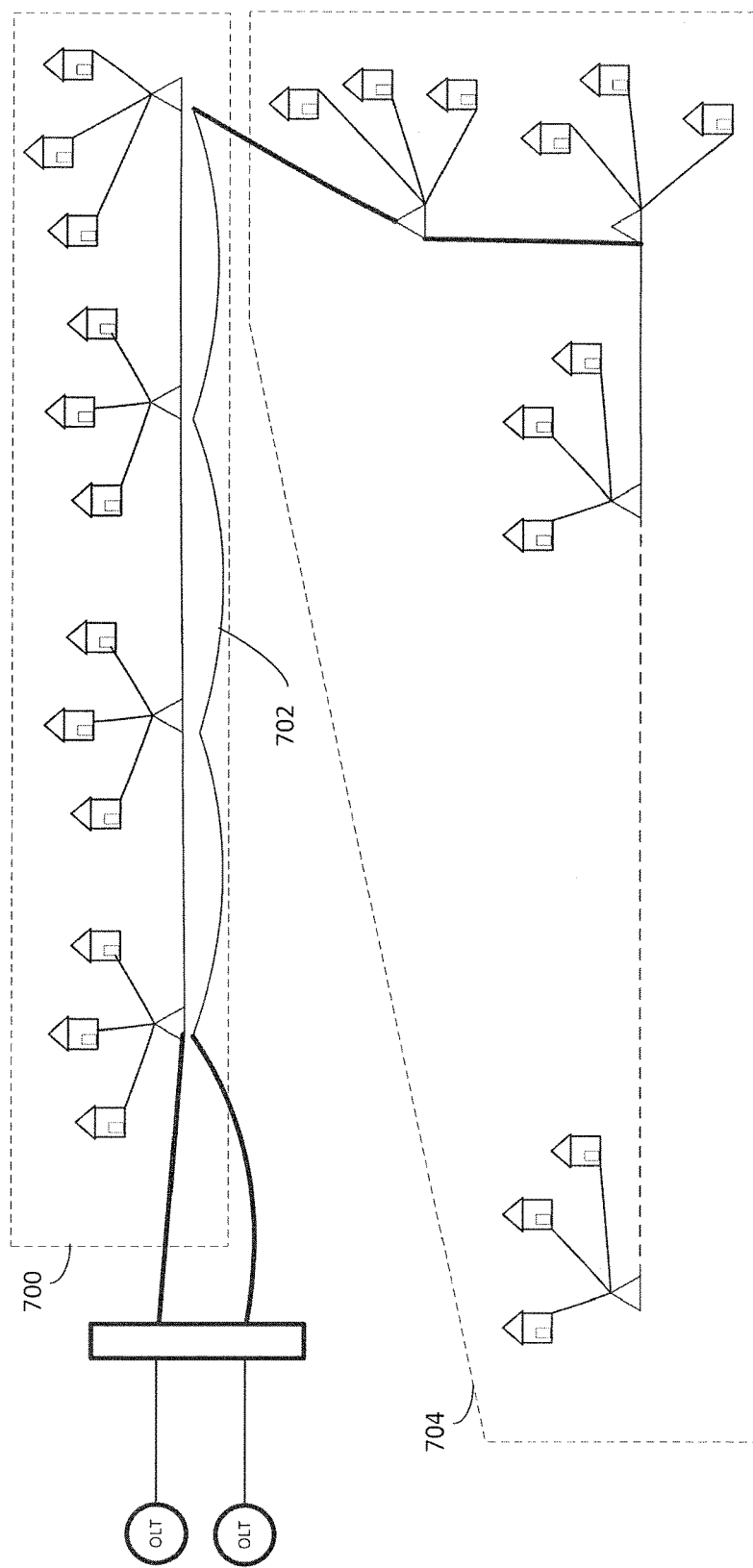
FIG. 7 is an exemplary optic fiber distribution network incorporating optic fiber tap assemblies of the type depicted in FIGS. 4-6.
Figure 8:
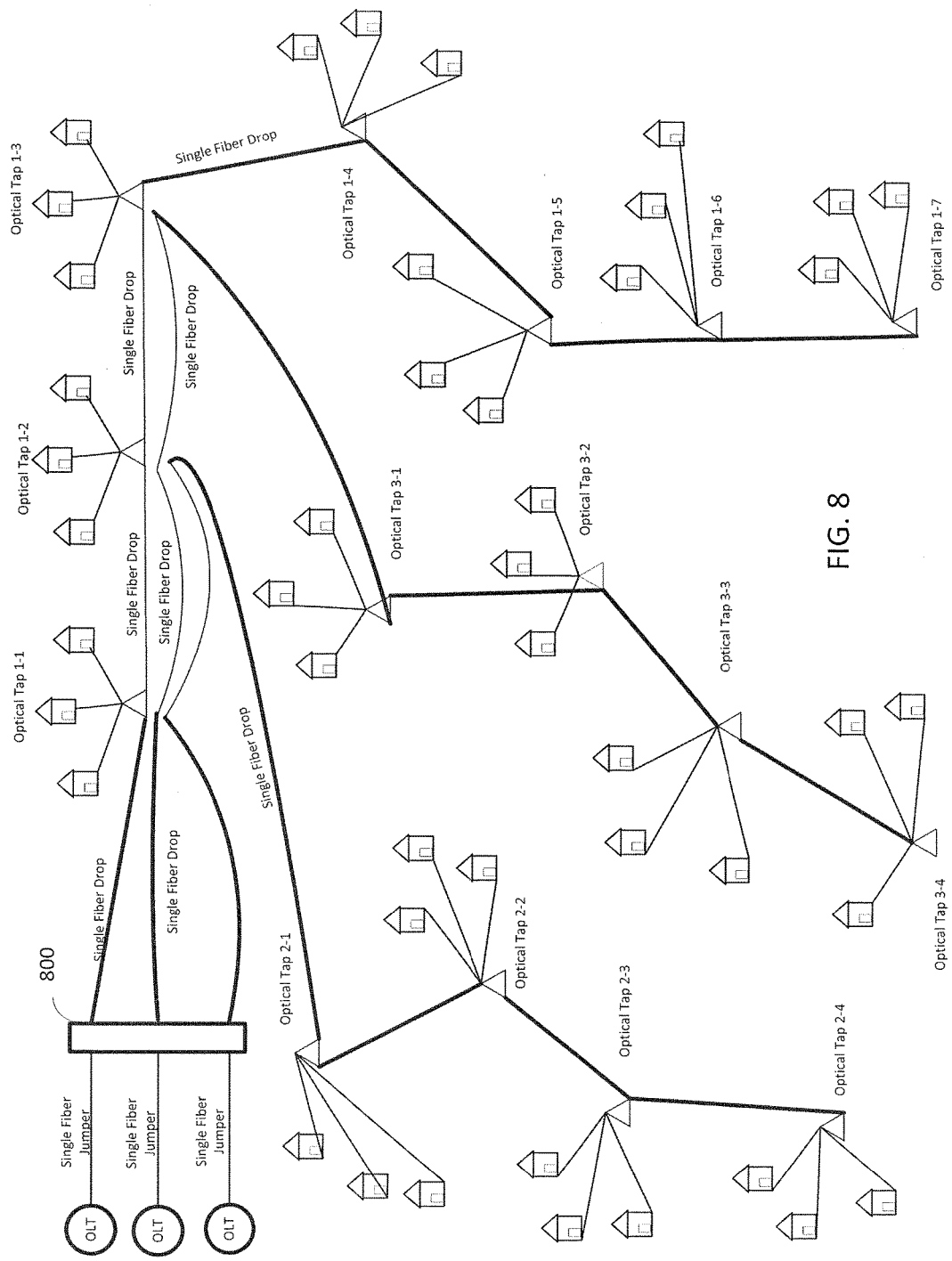
FIG. 8 is an exemplary optic fiber distribution sub-network comprising a combination of multi-fiber and single fiber runs.
Figure 9:
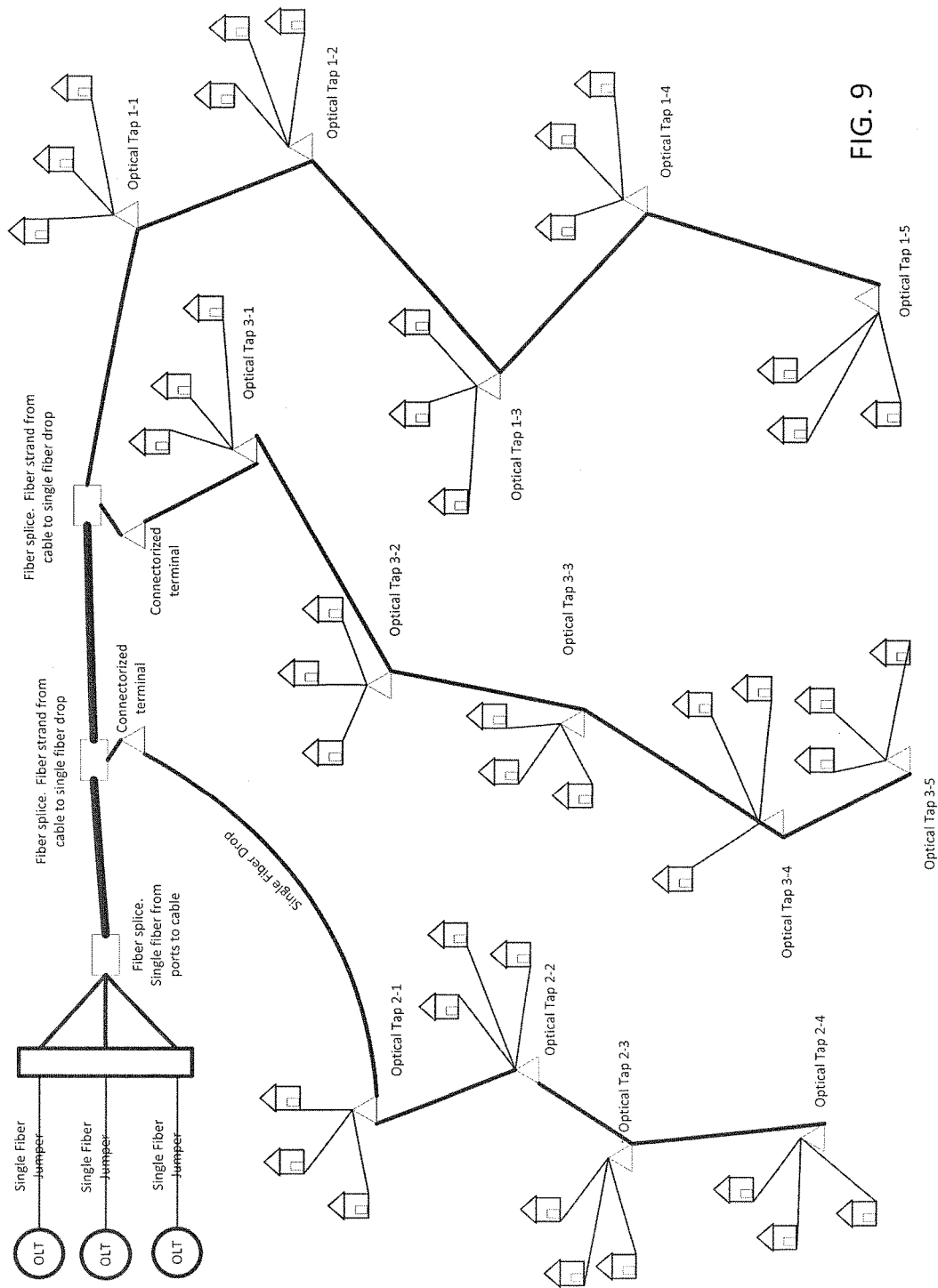
FIG. 9 is an exemplary optic fiber distribution sub-network comprising a combination of fiber splices along a main distribution run, and fully connectorized optic fiber taps at branches of the main distribution run.

Turning to FIGS. 7, 8 and 9, exemplary optic fiber distribution sub-networks are depicted that show the diverse types of sub-network topologies that are supported by the variously described optic fiber tap assemblies/cabinets described with reference to FIGS. 2-6. In FIG. 7, an exemplary network based upon the path-through structures is shown wherein a first portion 700, of the series of fully connectorized optic fiber tap assemblies, receives an optical signal carried by optic fiber distribution line 701. The optic fiber tap assemblies of the first portion 700, per the optic fiber tap assembly structures depicted in FIG. 4, also provide connection interfaces for a pass-through optic fiber distribution line 702 that provides optic fiber signal connectivity to a second portion 704 of the series of optic fiber tap assemblies.

Turning to FIG. 8, yet another exemplary sub-network topology is depicted wherein cabinets housing the fully connectorized optic fiber tap assemblies also operate as branching locations for pass through optic fiber lines feeding downstream branches of a multi-line sub-network rooted at a fiber patch panel 800.

Turning to FIG. 9, yet another exemplary sub-network topology is depicted wherein the sub-network comprises a set of splices (in well-protected portions of an optic fiber distribution line) and connectors at less protected portions of the distribution line (including in the distribution lines containing fully connectorized optic fiber taps for single fiber residential drop distribution lines comprising multiple segments of single fiber drop line connected via fully connectorized optic fiber tap connections.

Figure 10:
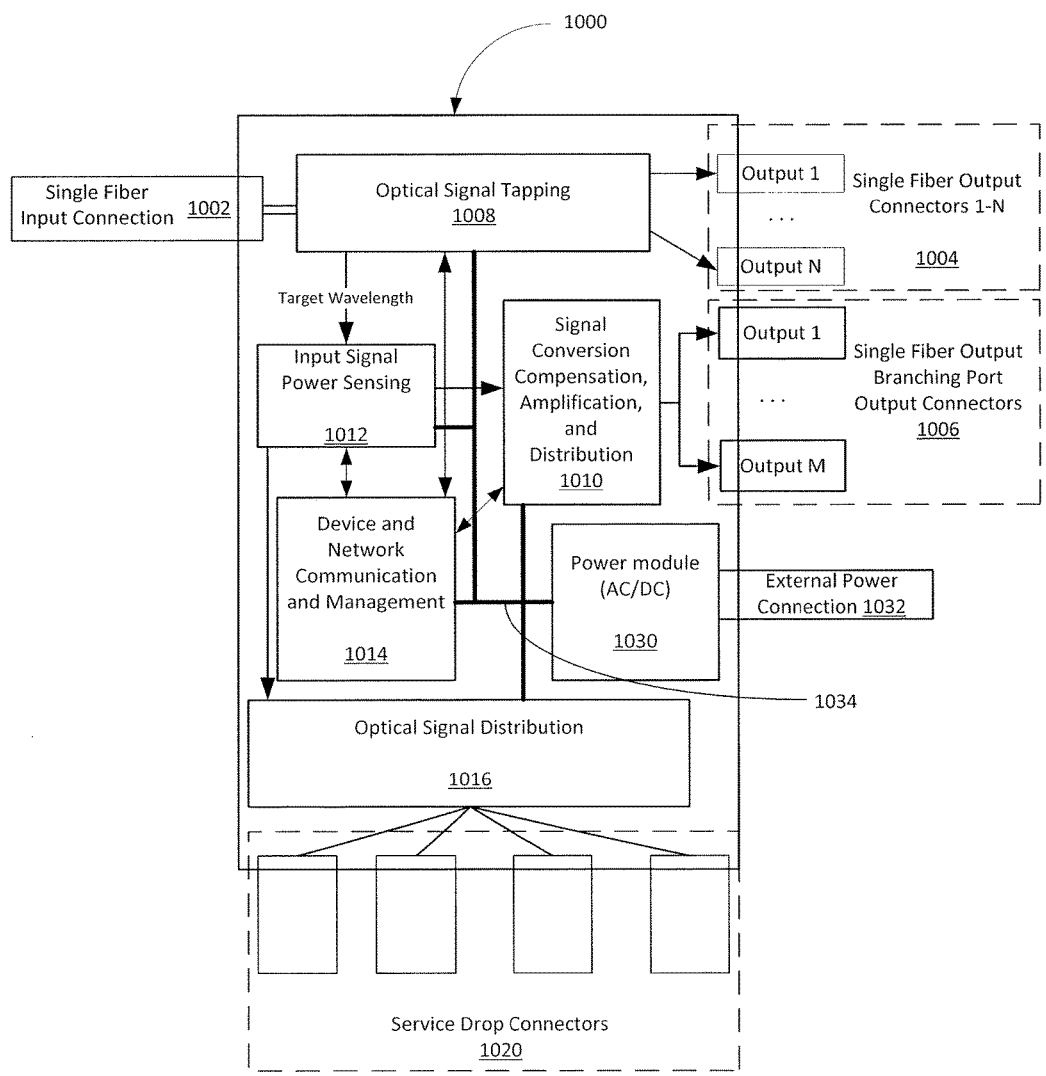
FIG. 10 is an alternative optic fiber tap assembly where an input signal is amplified via circuitry of an active (powered) optic fiber tap assembly.

Turning to FIG. 10, yet another illustrative example of an optic fiber tap assembly is schematically depicted. In the illustrative example of FIG. 10, a fully connectorized active optic fiber tap assembly (active tap assembly) 1000 is provided. The active tap assembly 1000 is independently powered (i.e. does not derive operating power from the input data signal) and responsively adapts optical signal tapping and/or amplification based upon signal level needs of downstream components. Such downstream components may be either/both optical fiber taps and network interface units of individual users. The active tap assembly 1000, in contrast to known optic fiber tap assembly devices, permits responsive adjustments to configurable parameters affecting one or more of: the percentage of tapped optical signal, amplification of the received optical signal for downstream optical signal recipients (e.g. connected downstream optic fiber taps), and target wavelength selection during tapping.

The active tap assembly 1000, through adjustable operating parameters, facilitates varying a quantity of either/both serially connected downstream optic fiber taps and/or service fiber drops (customers) supported by the active on a per distribution fiber/wavelength basis. Such configurability, which is supported by the active tap assembly 1000, may enable an operator to avoid a need to run an additional fiber to reach customers that may instead be serviced by extending optical signal reach along an existing optic fiber distribution line. Moreover, the ability to selectively tap a particular wavelength enables configurable designation of signal sources for particular customers (addressed by wavelength).

With specific reference to FIG. 10, the active tap assembly 1000 includes a single fiber input connector 1002 (but may include multiple input connectors in other illustrative examples of the active tap assembly). By way of example, the single fiber input connector 1002 is a passive (i.e. non-powered) component of the assembly 1000. Alternatively, the single fiber input connector 1002 is an active (i.e. powered) device. An example of an active connector component is a small form pluggable (SFP) connector that supports variable operation (e.g. selective signal amplification) based upon a specified input signal power target. By way of example, the signal power target may be a single value and/or multiple values specifying a signal power target range.

A set of "N" single fiber output connectors 1004 pass a conditioned (e.g. amplified) non-tapped portion of the optical signal received by the single fiber input connector 1002 from of the active optic fiber tap assembly 1000. The output connectors 1004, like the input connector 1002, may be passive or active (e.g. SFP) connectors. The multiple nature of the output connectors 1004 facilitates branching from the active optic fiber tap assembly 1000 of a single input signal to multiple (replicated) signals for downstream consumption by optical taps and/or drop line end units (e.g. NIUs) along diverging paths from the active optic fiber tap assembly 1000.

An optical wavelength tapping circuit 1008 provides coarse wave division multiplexing (CWDM) and dense wave division multiplexing (DWDM) wavelength selection elements supporting wavelength selection in accordance with GPON and NGPON2 protocols. The optical wavelength tapping circuit 1008 selectively taps optical energy from the input optical signal at a configured target: (1) wavelength, and/or (2) power percentage. The tapped optical energy passes to an optical power sensing circuit 1012. The optical wavelength tapping circuit 1008 passes the non-tapped remaining energy, including non-selected wavelength components of the optical signal received by the input connector 1002, to the output connectors 1004. The optical wavelength tapping circuit 1008 may additionally provide configurable (e.g. a specified gain) signal amplification for all, or a portion, of the input optical signal received by the input connector 1002 (e.g., amplify the non-tapped portion of the input signal output via the output connectors 1004.

An optical power sensing circuit 1012 measures the input signal power based upon a target wavelength optical signal provided by wavelength-specific optical tap elements within the tapping circuit 1008. In the illustrative example, the optical power sensing circuit 1012 operates as a configurable optical signal splitter between: (1) an optical signal distribution circuit 1016, and (2) an optical signal compensation and amplification element 1010. More specifically, the optical power sensing circuit 1012, based upon a threshold (minimum) signal power need of the optical signal distribution circuit 1016 (obtained through interactions with a management element 1014) providing the optical signal to a set of service drop connectors 1020, configures a portion of the signal power received from the wavelength tapping circuit 1008 that is separately passed to each of the optical signal distribution circuit 1016 and the optical signal compensation and amplification element 1010.

The optical signal compensation and amplification element 1010 provides signal correction (e.g. conversion compensation) and amplification for a remaining portion of the target optical wavelength signal (previously tapped by the tapping circuit 1008) received from the optical power sensing circuit 1012. The optical signal compensation and amplification element 1010 distributes a resulting corrected and amplified optical signal to a set of "M" single fiber output branching port output connectors 1006. The output connectors 1006, in turn, provide the corrected and amplified optical signal to a subset of distribution optical tap cascades that branch from the active optical tap assembly 1000.

The branching port output connectors 1006 permit the active tap assembly 1000 to provide an optic fiber signal feed to either short side routes or provide an interface to existing passive optical tap cascades. In the illustrative example, the optic fiber signal provided to the branching port output connectors 1006 has been converted (by the optical signal compensation and amplification element 1010) to a particular wave length required by a connected downstream optical tap cascade. Thus, the branching port output connectors 1006 (fed by the conditioned/amplified signal provided by element 1010) enable optic fiber network data service (infrastructure) operators to transition from passive optical tap assemblies to active optical taps without changing out the entire infrastructure at once.

Moreover, the combination of the optical signal compensation and amplification element 1010 and the output connectors 1006 eliminates a need for pass-through ports that may be needed in sub-networks that utilize passive optical tap assemblies, thereby eliminating a need for multiple single fiber drops passing through a same pedestal (containing the tap assemblies) along a same route only to branch off in a different direction per the optic fiber sub-network topologies illustratively depicted in FIGS. 7 and 8.

The management element 1014 provides a communications and programmed logic platform that defines the configurable optical signal distribution and amplification operation of the active tap assembly 1000 for a target wavelength. In an illustrative example, the management element 1014: (1) receives any of a variety of command and/or data parameter values from internal components of the active tap assembly 1000 and external configuration-related command and data sources, (2) processes the received parameter values, and (3) renders configuration instructions to appropriate control elements within the active tap assembly 1000. In the illustrative example, the management element 1014 provides configuration control instructions to: (1) the tapping circuit 1008, (2) the input optical signal power sensing circuit 1012, and (3) the optical signal compensation and amplification element 1010. Such control instructions issued by the management element 1014 set/modify a variety of signal parameter values, in the above-identified active components of the active tap assembly, including: gain, percentage of signal division between multiple downstream components, target wavelengths, target signal levels/ranges, etc.

For example, based upon received information indicating insufficient signal power to one or more residential users connected via the service drop connectors 1020, the management element 1014 issues an instruction to the optical power sensing circuit 1012 to provide a greater percentage of the received signal to the output feeding the service drop connectors 1020. In a general sense, the management element 1014 provides a programmable platform (operating system) for running a variety of monitoring, configuration, communications, etc. applications supporting the configurable functional components of the active tap assembly 1000. Such functionality includes support for: remote monitoring, network element configuration, end user configuration, software updates, signal troubleshooting, etc.

A power module 1030 supplies power to each of the active components of the active tap assembly 1000 via a power supply bus 1034. The power module 1030 is connected to an external power source via an external power connection 1032. By way of example, the power module 1030 receives AC (or DC) power via the external power connection 1032 and provides DC power via the power supply bus 1034.

The active optic fiber tap assembly 1000 provides extraordinary signal amplification, conditioning, selection, and distribution functionalities that are not needed by all optic fiber signal taps in a sub-network. Thus, one or more downstream units in a series of optical tap assemblies of a same sub-network may be passive.

Additionally, after initial build out, the fully connectorized active optic fiber tap assembly may allow the network operator to manage the amount of customers per wavelength and make changes to the numbers as needed without changing the physical sub-network. For example, using current technology, a single wavelength may serve 128 customers that consume the entire bandwidth support by the single wavelength. However, the customers may need/demand higher individual bandwidth. To provide more individual bandwidth (capacity), a portion of the 128 user (e.g. 50 customers) could be assigned to a new wavelength on the fiber. Thus, through reconfiguration of active tap assemblies such as active tap 1000 of FIG. 10 (via remote configuration instructions received and processed by active optic fiber taps), an optic fiber data network service provider can "move" 50 of the customers to another wavelength without sending anyone on-site to make any physical changes to the optic fiber distribution network. Rather the changes resulting in the "move" are handled via remotely issued commands/instructions processed by software executed by the active tap assemblies resulting in reconfiguration of tap assembly components responsible for tapping and forwarding portions of a receive optical signal carried on a distribution line of the sub-network. So in practice each wavelength could have a dynamically shifting customer count based on capacity needs and services sold by an optical network data services provider.

The described examples herein are not limited to use of particular types of optic fiber lines (e.g. single or multi-mode fiber). Rather a variety of optic fiber line types are contemplated in accordance with various alternative implementations of optic fiber distribution sub-networks.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description.

The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fully connectorized optic fiber tap assembly for incorporation into an optic network, the fully connectorized optic fiber tap assembly comprising:
 a first connector interface configured to receive a first connector of a first optic fiber line;
 a second connector interface configured to receive a second connector of a second optic fiber line;
 a set of service drop line connector interfaces; and
 an optic fiber tap configured to:
  receive an optical signal from the first connector interface,
  extract a portion of the optical signal,
  direct the extracted portion of the optical signal to the set of service drop line connector interfaces, and
  pass a remaining portion of the optical signal to the second connector interface,
 wherein the fully connectorized optic fiber tap assembly is configured to be connected to the first optic fiber line and the second optic fiber line without splicing, and
 wherein the optic fiber tap assembly is an active optic fiber tap assembly comprising at least one active optical signal element.

2. The fully connectorized optic fiber tap assembly of claim 1 further comprising a pass-through connector interface assembly, comprising:
 a third connector interface,
 a fourth connector interface, and
 an optic fiber line terminated by the third connector interface and the fourth connector interface,
 third optic fiber line and a fourth optic fiber line of an optic fiber distribution network.

3. The fully connectorized optic fiber tap assembly of claim 1 wherein the set of service drop line connector interfaces comprise multiple connector interfaces for receiving a set of service drop lines.

4. The fully connectorized optic fiber tap assembly of claim 1 wherein the optic fiber tap assembly operates without electrical power.

5. The fully connectorized optic fiber tap assembly of claim 1 wherein the at least one active optical signal element comprises an optical signal amplifier.

6. The fully connectorized optic fiber tap assembly of claim 1 wherein the at least one active optical signal element comprises an optical signal tap.

7. The fully connectorized optic fiber tap assembly of claim 1, wherein the at least one active optical signal element comprises an optical signal splitter.

8. The fully connectorized optic fiber tap assembly of claim 7 wherein the optical signal splitter is configurable to distribute an input optical signal power between:
 an optical signal distribution circuit providing optical signal output to a set of service drop connectors, and
 an optical signal amplifier circuit providing an amplified optical signal to a downstream output connector interface for transmission of the amplified optical signal to a downstream distribution line of the optic fiber network.

9. The fully connectorized optic fiber tap assembly of claim 1 further comprising a component configured to communicate configuration information and issue configuration instructions to change operation of the at least one active optical signal element.

10. The fully connectorized optic fiber tap assembly of claim 1 wherein the at least one active optical signal element is a configurable active optical signal element.

11. An optic fiber network comprising:
 a fiber patch panel;
 a first optic fiber line signally connected to the fiber patch panel;
 a second optic fiber line;
 a first optic fiber tap assembly for incorporation into the optic fiber network, the first optic fiber tap assembly comprising:
  a first interface configured to receive a first optic fiber line;
  a second interface configured to receive a second optic fiber line;
  a first set of service drop line interfaces; and
  a first optic fiber tap configured to:
   receive an optical signal from the first upstream-interface,
   extract a portion of the optical signal,
   direct the extracted portion of the optical signal to the first set of service drop line interfaces, and
   pass a remaining portion of the optical signal to the second interface,
 wherein the optic fiber tap assembly is connected to the first optic fiber line and the second optic fiber line without splicing, and
 wherein the second optic fiber line is buried to a depth below grade on the order of one foot.

12. The optic fiber network of claim 11 further comprising:
 a second optic fiber tap assembly for incorporation into the distribution line of the optic fiber network, the second optic fiber tap assembly comprising:
  a third interface configured to receive the second optic fiber line;
  a second set of service drop line interfaces; and
  a second optic fiber tap configured to:
   receive an optical signal from the third interface,
   extract a portion of the optical signal, and
   direct the extracted portion of the optical signal to the second set of service drop line interfaces;
 wherein the second optic fiber tap assembly is connected to the second optic fiber line without splicing.

13. The optic fiber network of claim 12 further comprising at least two optic fiber distribution lines running through both the first optic fiber tap assembly and the second optic fiber tap assembly.

14. The optic fiber network of claim 12 wherein a hybrid distribution line of the network comprises:
 a first optic fiber distribution line directly connected to the fiber patch panel;
 the first optic fiber line; and
 the second optic fiber line,
 wherein at least one spliced connection exists between the first optic fiber distribution line and the first optic fiber line.

* * * * *